US008080780B2

(12) United States Patent
Burr et al.

(10) Patent No.: US 8,080,780 B2
(45) Date of Patent: Dec. 20, 2011

(54) APPARATUS AND ASSOCIATED METHODOLOGY FOR IMPROVING TIMING RESOLUTION IN GAMMA RAY DETECTION

(75) Inventors: Kent C. Burr, Buffalo Grove, IL (US); Daniel Gagnon, Twinsburg, OH (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 21 days.

(21) Appl. No.: 12/649,159

(22) Filed: Dec. 29, 2009

(65) Prior Publication Data
US 2011/0155898 A1 Jun. 30, 2011

(51) Int. Cl.
*G01D 18/00* (2006.01)
(52) U.S. Cl. .................................................. 250/252.1
(58) Field of Classification Search ............... 250/252.1, 250/363.01–363.1, 370.01–370.15, 362; 378/98.8
See application file for complete search history.

(56) References Cited

U.S. PATENT DOCUMENTS

| 7,342,231 | B2 * | 3/2008 | Warburton et al. | 250/362 |
| 2010/0084560 | A1 * | 4/2010 | Aykac et al. | 250/362 |

OTHER PUBLICATIONS

Petrick et al., "Least squares arrival time estimators for photons detected using a photomultiplier tube," 1991, IEEE Nuclear Science Symposium and Medical Imaing Conference, vol. 1, pp. 201-204.*
J.-D. Leroux et al., Time Determination of BGO-APD Detectors by Digital Signal Processing for Positron Emission Tomography, 2004 IEEE, pp. 1723-1727.

R. I. Wiener et al., "An Investigation of Waveform Sampling for Improved Signal Processing in TOF PET", Nov. 14, 2008, IEEE, 5 pages.
H. Kim et al., "A multi-threshold sampling method for TOF-PET signal processing", Jan. 2009, Nucl. Instr. and Meth. A (2009) 4 pages.
W.W. Moses, "Time of Flight in PET Revisited", IEEE Transaction on Nuclear Science, vol. 50, No. 5, Oct. 2003, pp. 1325-1330.
Michael D. Haselman et al., "Simulation of Algorithms for Pulse Timing in FPGAs", IEEE Nucl Sci Symp Conf Rec (1997). 2007, pp. 1-14.
Abdelkader Bousselham et al., "Sampling Pulses for Optimal Timing", IEEE Transactions on Nuclear Science, vol. 54, No. 2, Apr. 2007, pp. 320-326.
Peter D. Olcott et al., "A high speed fully digital data acquisition system for Positron Emission Tomography", 2006 IEEE Nuclear Science Symposium Conference Record, pp. 1909-1911.

(Continued)

*Primary Examiner* — David Porta
*Assistant Examiner* — Kiho Kim
(74) *Attorney, Agent, or Firm* — Oblon, Spivak, McClelland, Maier & Neustadt, L.L.P.

(57) ABSTRACT

An apparatus and associated method for gamma ray detection that improves the timing resolution is provided. A crystal of interaction in a scintillation crystal array emits scintillation light in response to interaction with a gamma ray. The scintillation light is detected by one or more photomultiplier tubes. Each photomultiplier tube that detects the scintillation light detects the light at a different time. The apparatus determines the location of the gamma ray interaction and uses the location of the interaction to generate correction times for each waveform generated by the photomultiplier tubes. The waveforms are corrected with the correction timings and combined to extract a time of arrival estimate for the gamma ray. Noise thresholding is also used to select waveforms having low noise for combination to extract the time of arrival estimate.

28 Claims, 7 Drawing Sheets

OTHER PUBLICATIONS

Suleman Surti et al., "Performance of Philips Gemini TF PET/CT Scanner with Special Consideration for Its Time-of-Flight Imaging Capabilities", J Nucl Med 2007, pp. 471-480.

P. Stenström, et al. "A New Scalable Modular Data Acquisition System for SPECT (PET)" IEEE Transactions on Nuclear Science, vol. 45, No. 3, Jun. 1998, pp. 1117-1121.

* cited by examiner

APPARATUS AND ASSOCIATED METHODOLOGY FOR IMPROVING TIMING RESOLUTION IN GAMMA RAY DETECTION

BACKGROUND OF THE INVENTION

1. Field of the Invention

The present disclosure generally relates to an apparatus and associated methodology for improving timing resolution in gamma ray detection. More specifically, the present disclosure relates to an apparatus and associated methodology for improving timing resolution in a gamma ray detection system, such as a positron emission tomography system, by generating timing corrections with respect to an identified interaction location.

2. Discussion of the Background

A commercial gamma ray detector includes an array of scintillator crystals coupled to a transparent light guide, which distributes scintillation light over an array of photomultiplier tubes (PMTs) arranged over the transparent light guide. A position of a gamma ray interaction within the array of scintillator crystals is generally encoded by spreading the optical signal corresponding to the gamma ray over several PMTs grouped into a neighborhood. By measuring relative signal intensities from each of the PMTs in the neighborhood and applying statistical methods or performing a centroid calculation, the location of the gamma ray is decoded.

Signals from the PMTs corresponding to a neighborhood are generally summed in the analog domain, and then timing is measured based on the leading edge of the summed signal. Multiple effects can contribute to relative delays between the PMT signals within the neighborhood. For scintillator crystals with substantially polished surfaces, photons exiting at large angles with respect to the crystal array surface travel significantly farther distances within the crystal than photons exiting at a small angles. These path length differences can be on the order of four times the crystal length, and for high index-of-refraction crystals (approaching or exceeding n=2) path length differences can contribute 200 ps-300 ps of delay for a 10 mm-long scintillator crystal. In a 20 mm-long crystal the delay may be 400 ps-600 ps or more.

Once the scintillation photons reach the output surface of the crystal, there can be significant differences in path length for optical photons traveling to different PMTs. For example, a light guide with an index of refraction of 1.5 may cause a path length difference of 28 mm or more, leading to relative delays among the photon of approximately 140 ps within the light guide itself for photons traveling to two or more different PMTs.

Therefore, the above-described effects combine to yield relative delays of 350 ps to 750 ps or more depending on the specific geometry for photons traveling to several different PMTs. These delays cause a measurable degradation in timing resolution for commercial positron emission tomography (PET) systems, which strive towards timing resolutions of 400 ps or better. Moreover, these relative delays are dependent upon the location of a crystal with which the gamma ray interacts, causing each PMT to lead or lag other PMTs in its neighborhood depending on the position of the crystal with which the gamma ray interacts relative to the PMTs.

In most conventional gamma ray detection systems the timing signal is not derived from digital sampling or multi-threshold sampling. Instead, a composite timing signal is generated by analog summation of signals from a number of PMTs. Then a leading-edge or constant-fraction discriminator is applied to the composite signal. The PMTs whose signals are summed are often referred to as a "trigger zone," which may overlap or which may be kept separate. Irrespective of the amount of overlap among trigger zones, conventional gamma ray detection systems have fixed trigger zones that are hard-wired on the system's circuit boards. Timing resolution in these conventional systems degrades with increasing count rate because the tails of previous signals on part of the PMTs in a trigger zone interfere with timing detection of subsequent gamma ray-crystal interactions. This interference increases as the average time between interactions decreases, i.e., or the count rate increases.

Gamma ray detection systems that employ digital waveform sampling or multi-threshold sampling are known, but they generally consider only a single photosensor when deriving timing information. A discussion of conventional gamma ray detection systems employing sampling to derive timing information may be found in:

(1) J.-D. Leroux, J.-P. Martin, D. Rouleau, C. M. Pepin, J. Cadorette, R. Fontaine and R. Lecomte, "Time Determination of BGO-APD Detectors by Digital Signal Processing for Positron Emission Tomography", IEEE Nuclear Science Symposium, Conference Record, 2003, Portland, Oreg.;

(2) R. I. Wiener, S. Surti, C. C. M. Kyba, F. M. Newcomer, R. Van Berg, and J. S. Karp, "An Investigation of Waveform Sampling for Improved Signal Processing in TOF PET", IEEE Medical Imaging Conference, Conference Record, 2008, Dresden, Germany; and (3) H. Kim, C. M. Kao, Q. Xie, C. T. Chen, L. Zhou, F. Tang, H. Frisch, W. W. Moses, W. S. Choong, "A multi-threshold sampling method for TOF-PET signal processing", Nucl. Instr. and Meth. A (2009). Therefore, further discussion of the background art is omitted here for brevity.

The contents of the above-identified documents are incorporated herein by reference.

SUMMARY OF THE INVENTION

An exemplary embodiment of the present invention provides a method of improving timing resolution in a gamma ray detector by sampling waveforms from a plurality of photosensors arranged over at least one crystal element, where the waveforms are generated by the photosensors in accordance with scintillation light emitted by the at least one crystal element in response to arrival of a gamma ray. The method also includes identifying a location of a scintillation event within the at least one crystal element, and determining correction times for each of the waveforms based on the location of the scintillation event. Then, each of the waveforms is corrected using the correction times, and a time of arrival of the gamma ray at the at least one crystal element is estimated based on the corrected waveforms.

In another exemplary embodiment of the present invention, a gamma ray detector includes a plurality of samplers to sample waveforms from a plurality of photosensors arranged over at least one crystal element, where the waveforms are generated in accordance with scintillation light emitted by the at least one crystal element in response to arrival of a gamma ray. The gamma ray detector also includes an electronic memory to store the waveforms after sampling, and a data processor connected to the plurality of samplers that identifies a location of a scintillation event within the at least one crystal element. The data processor also determines correction times for each of the waveforms based on the location of the scintillation event, and corrects each of the waveforms using the correction times. Then the data processor estimates a time of arrival of the gamma ray at the at least one crystal.

In yet another exemplary embodiment of the present invention, a computer-readable medium storing computer-readable instructions is provided. The computer-readable instructions, when executed by a computer, cause the computer to perform a method including sampling waveforms from a plurality of photosensors that are arranged over at least one crystal element. The waveforms are generated by the photosensors in accordance with scintillation light emitted by the at least one crystal element in response to arrival of a gamma ray. The method also identifies a location of a scintillation event within the at least one crystal element, and determines correction times for each of the waveforms based on the location. The method also corrects each of the waveforms using the correction times, and estimates a time of arrival of the gamma ray at the at least one crystal element based on the corrected waveforms.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
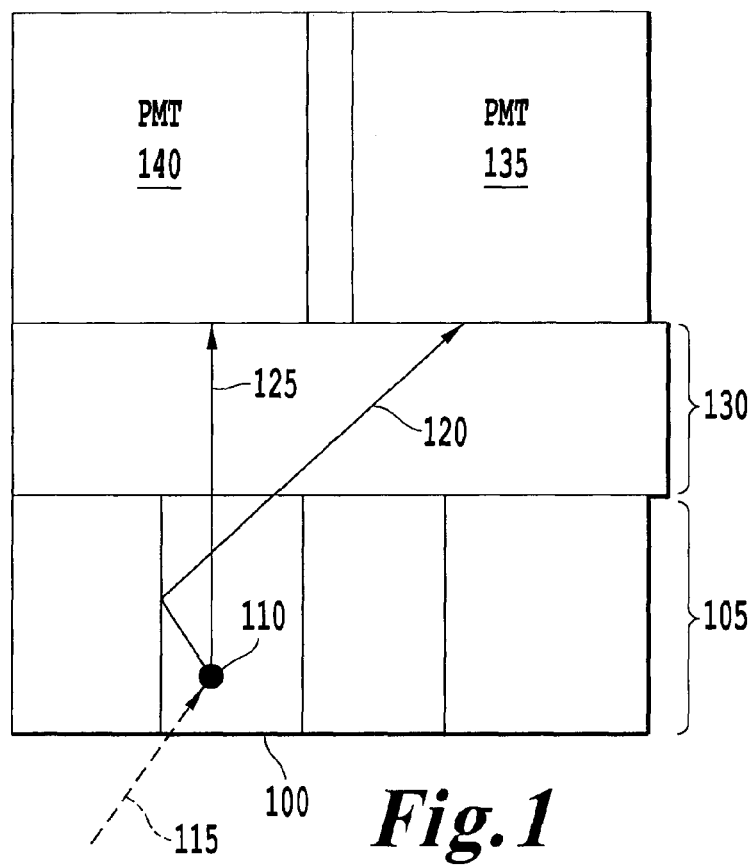
FIG. 1 is a schematic drawing of gamma ray detection in accordance with an exemplary embodiment of the present invention.

Referring now to the drawings, wherein like reference numerals designate identical or corresponding parts throughout the several views, FIG. 1 is a schematic drawing of gamma ray detection according to an exemplary embodiment of the present invention. In FIG. 1, a gamma ray detector includes photomultiplier tubes (PMT) 135 and 140 arranged over an array of scintillation crystals 105, with a light guide 130 therebetween. This discussion considers the case where PMTs are used as photosensors. However, one skilled in the art will recognize that any photosensors, including single-channel PMTs, multi-anode PMTs, avalanche photodiodes (APDs), arrays of APDs, silicon photomultipliers (SiPMs), or arrays of SiPMs can be used without departing from the scope of the present invention.

Further, one of ordinary skill in the art will recognize that though FIG. 1 includes an array of scintillation crystals, other gamma ray detection devices, such as monolithic scintillators, may be used with the present invention. As such, the embodiment of FIG. 1 is merely exemplary and in no way limits the scope of the present invention.

In FIG. 1, when gamma ray 115 interacts with the crystal of interaction 100, scintillation light rays 120 and 125 are generated from the location of the scintillation event 110. The scintillation light rays 120 and 125 travel through the crystal of interaction 100 and the light guide 130 to reach the photomultiplier tubes 135 and 140. However, scintillation light ray 125 travels directly from the scintillation event 110 to photomultiplier tube 140, while scintillation light ray 120 bounces within the crystal of interaction 100 and is deflected towards photomultiplier tube 135. Thus, scintillation light ray 120 travels a longer distance relative to scintillation light ray 125.

In FIG. 1, only two rays of scintillation light rays are shown for brevity. However, one skilled in the art will recognize that multiple scintillation light rays of scintillation light may be generated at the scintillation event 110, scatter throughout the crystal of interaction 100 and light guide 130, and impinge upon more than two photomultiplier tubes. As such, the number of scintillation light rays 120, 125 in FIG. 1 is merely exemplary and not limiting upon the present invention.

Returning to FIG. 1, the additional distance traveled by scintillation light ray 120 results in a detection delay time in photomultiplier tube 135 with respect to photomultiplier tube 140. In other words, photomultiplier tube 140 detects the scintillation event 110 via scintillation light ray 125 before photomultiplier tube 135 detects the scintillation event 110 via scintillation light ray 120. Thus, the waveform generated by photomultiplier tube 140 will lead the waveform generated by photomultiplier tube 135. Further, the intensity of scintillation light ray 125 detected by photomultiplier tube 140 may be higher than the intensity of scintillation light 120 detected by photomultiplier tube 135. Accordingly, the amplitude of the waveform generated by photomultiplier tube 140 is larger than the amplitude of the waveform generated by photomultiplier tube 135. Alternatively, photomultiplier tube 135 may detect the higher intensity scintillation light ray and photomultiplier tube 140 may detect the lower intensity scintillation light ray, or both multiplier tubes 135, 140 may detect scintillation light of the same intensity. As such, photomultiplier tubes 135, 140 may detect scintillation light of varying intensities and generate corresponding signals with varying voltage levels without departing from the scope of this embodiment of the present invention.

Figure 2:
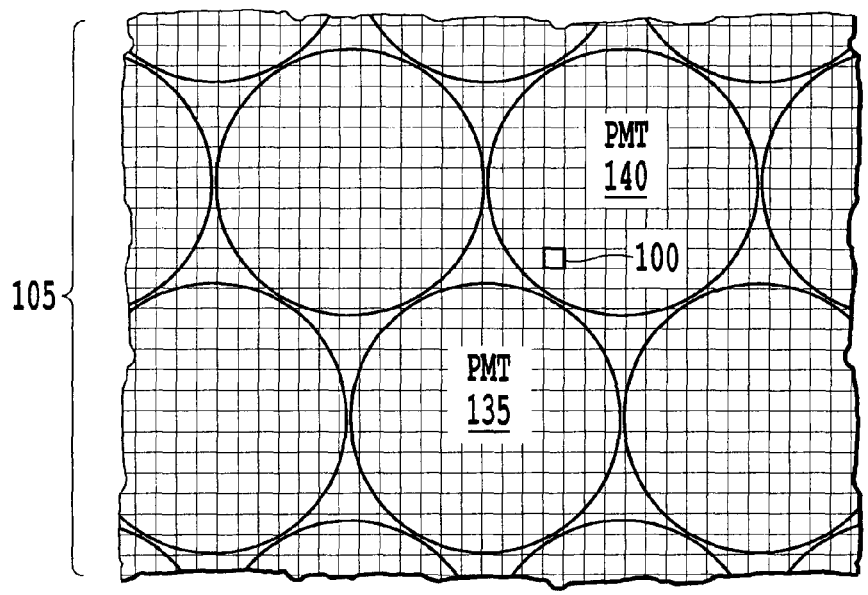
FIG. 2 is a schematic drawing of photomultiplier tubes arranged over an array of scintillation crystals in accordance with an exemplary embodiment of the present invention.

FIG. 2 is another schematic drawing of the photomultiplier tubes 135, 140 and scintillation crystal array 105 when viewed from above. In FIG. 2, the crystal of interaction 100 is located under photomultiplier tube 140 and photomultiplier tube 135 is located diagonally from photomultiplier tube 140. Thus, the distance traveled by scintillation light rays 120, 125 emitted by the crystal of interaction 100 depends both on the location of the crystal of interaction 100 within the array of scintillation crystals 105 and the arrangement of the photomultiplier tubes over the array of scintillation crystals 105. As one of ordinary skill in the art will recognize, multiple photomultiplier tube arrangement patterns and scintillation crystal array arrangement patterns are possible without departing from the scope of the present invention. Therefore, the arrangement of FIGS. 1 and 2 is merely exemplary and not limiting upon the present invention.

Additional sources of variation may contribute to the relative delay between the signals from photomultiplier tube 135 and photomultiplier tube 140. Photomultiplier tubes of the same design and produced in the same factory can have natural variations in the transit time of the electronic signals within the PMT of several hundred picoseconds or more. Also, photomultiplier tube 135 and photomultiplier tube 140 could have significantly different designs. In this case, the transit time variation between photomultiplier tube 135 and photomultiplier tube 140 could be on the order of several nanoseconds.

Figure 3:
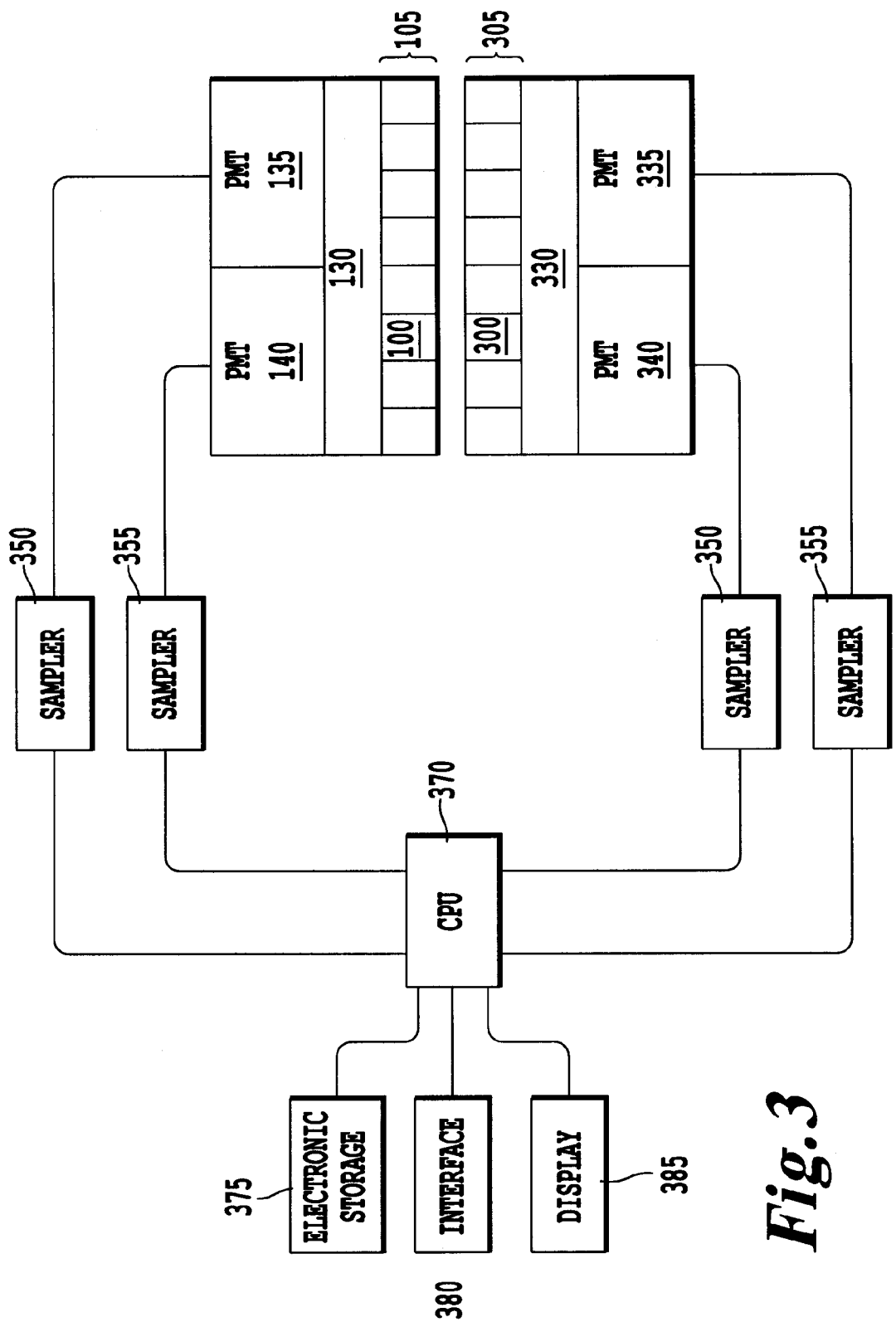
FIG. 3 is a schematic drawing of a gamma ray detection system according to an exemplary embodiment of the present invention.

FIG. 3 is a schematic drawing of a gamma ray detection system according to an exemplary embodiment of the present invention. As one of ordinary skill will recognize, the gamma ray detection system of FIG. 3 may form part of a positron emission tomography (PET) system or a Time-of-Flight PET system. Further discussion of PET and Time-of-Flight PET systems is omitted for brevity. However, a discussion of Time-of-Flight PET systems may be found in "Time of Flight in PET Revisited," by W. W. Moses, *IEEE Transactions on Nuclear Science*, Vol. 50, No. 5, pp. 1325-1330, the entire contents of which are incorporated herein by reference.

In FIG. 3, photomultiplier tubes 135 and 140 are arranged over light guide 130, and the array of scintillation crystals 105 is arranged beneath the light guide 130. Thus, the arrangement of the photomultiplier tubes 140 and 135, light guide 130 and array of scintillation crystals 105 is the same as in FIG. 1. A second array of scintillation crystals 305 is disposed opposite to the scintillation crystal array 105 with light guide 330 and photomultiplier tubes 335, 340 arranged thereover.

In FIG. 3, when gamma rays are emitted from a body under test (not shown), the gamma rays travel in opposite directions, approximately 180° from each other. Gamma ray detection occurs nearly simultaneously at crystal of interaction 100 and crystal of interaction 300, and a coincidence event 110 is determined when the gamma rays are detected at crystal of interaction 100 and crystal of interaction 300 within a predefined time limit. Thus, the PET detection system detects gamma rays nearly simultaneously at crystals of interaction 100 and 300. However, for simplicity only gamma detection at crystal of interaction 100 is described herein. One of ordinary skill in the art will recognize, however, that the description given with respect to crystal of interaction 100 is equally applicable to gamma ray detection at crystal of interaction 300.

Returning to FIG. 3, each photomultiplier tube 135, 140, 335 and 340 is respectively connected to a sampler 350, 355, 360 and 365. The samplers 350, 355, 360 and 365 generate digitized waveforms by sampling the waveforms generated by the photomultiplier tubes 135, 140, 340 and 335 in response to the scintillation light.

Samplers 350, 355, 360, 365 may be analog-to-digital converters, such as sigma-delta or flash converters operating at sampling rates between one gigahertz and five gigahertz. Alternatively, samplers 350, 355, 360, 365 may also be multi-threshold samplers that sample the photomultiplier tube waveforms using voltage-threshold triggers rather than a constant sampling rate. As one of ordinary skill in the art will recognize, other sampling methods are also possible without departing from the scope of the present invention.

After sampling, the waveforms are provided to central processing unit 370 for processing to determine gamma ray times of arrival according to the method described in detail below. The generated waveforms and time of arrivals are then stored in electronic storage 375 and can be displayed on display 385. Interface 380 may be used to configure and/or control the central processing unit 370 and/or provide further instruction to the central processing unit 370 for analysis of the generated times of arrival.

As one skilled in the art would recognize, display 385 may be a cathode ray tube display (CRT), liquid crystal display (LCD) and the like. Interface 380 may be a keyboard, mouse, trackball, microphone, touch screen, or any other known device for interfacing with a central processing unit. One of ordinary skill will also recognize that the electronic storage 375 may be a hard disk drive, CD-ROM, DVD disk, FLASH memory, or another central processing unit. Further, electronic storage 375 may be removable or detachable from central processing unit 370 or may be affixed thereto. Electronic storage 375 may also be connected to the central processing unit via a network, and may therefore be located in a separate room, building or other location relative to the central processing unit 370.

Figure 4:
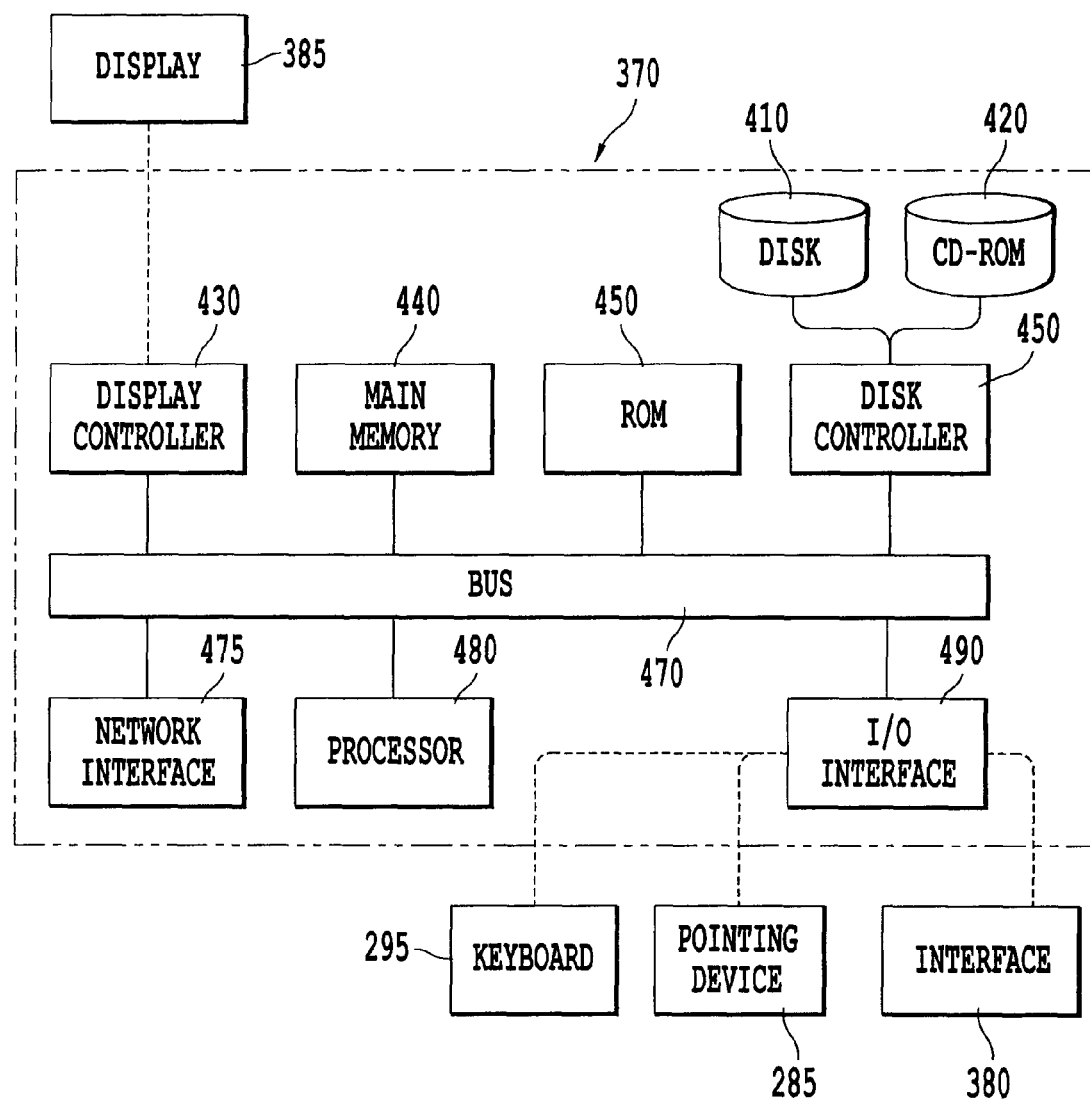
FIG. 4 is a block diagram of the central processing unit in the gamma ray detector system according to an exemplary embodiment of the present invention.

FIG. 4 is a block diagram of the central processing unit 370 according to an exemplary embodiment of the present invention. The central processing unit 370 includes a processor 480 which processes data and instructions stored in main memory 440 and/or ROM 450. The processor 480 may also process information stored on the disk 410 or CD-ROM 420. The exemplary processor 480 may be a Xenon processor from Intel of America or an Opteron processor from AMD of America. As one of ordinary skill in the art will recognize, the processor 480 may also be a Pentium processor, Core 2 Duo processor and the like. Thus, instructions corresponding to a method for gamma ray detection may be stored on any one of disk 410, CD-ROM 420, main memory 440 or ROM 450.

The central processing unit 370 may also include a network interface 475, such as an Intel Ethernet PRO network interface card from Intel Corporation of America, for interfacing with a network, such as the Internet or a private network. Display controller 430 may be a NVIDIA G-Force GTX graphics adapter from NVIDIA Corporation of America for interfacing with display 385. The central processing unit 370 may also include an I/O interface 490 for interfacing with a keyboard 295, pointing device 285 or other general interface 380, such as a microphone, trackball, joystick, touchscreen and the like.

Disk controller 460 interconnects disk 410, which may be a hard disk drive or FLASH memory drive, and CD-ROM 420 or a DVD drive with bus 470, which may be an ISA, ESIA, VESA, PCI, or similar for interconnecting all of the components of the central processing unit 370. A description of the general features and functionality of the components of the central processing unit 370 is omitted for brevity as these features are well known. Of course, other processors and hardware vendors and types known in the art may also be used with the present invention, such as Freescale Cold Fire, I. MX and ARM processors from Freescale Corporation of America.

The exemplary central processing unit 370 may also be implemented separately on FPGA's, ASIC's, microcontroller, PLD's or other computer-readable mediums such as an optical disk. In addition, the exemplary central processing unit 370 is a hardware platform of a computing device, such as a PC, and processor 480 may be for example an Intel Pentium Processor, or any other processor known in the art. The computer-readable instructions stored on any one of the main memory 440, ROM 450, disk 410 or CD-ROM 420 may be provided as a utility application, background daemon, or component of an operating system, or combination thereof, executing in conjunction with processor 480 and an operating system such as Microsoft VISTA, UNIX, Solaris, LINUX, Apple MAC-OS and other systems known to those skilled in the art.

Main memory 440 and/or ROM 450 supports registries and the like features of the central processing unit 370. As such, main memory 440 may be a random access memory (RAM), FLASH memory, EEPROM memory, or the like, while ROM 450 is Read Only Memory, such as a PROM. Further descriptions of main memory 440 and ROM 450 are omitted for brevity as such memory is well known.

Figure 5A:
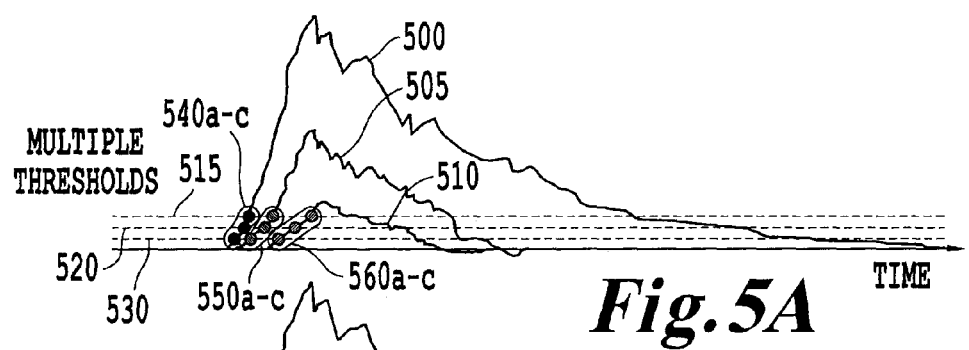
FIGS. 5A-5F are waveforms generated by the photomultiplier tubes according to an exemplary embodiment of the present invention.

Next, the process of applying timing correction to the photomultiplier tube waveforms is described with reference to FIGS. 5A-5F. Although the waveforms shown in FIG. 5 are positive waveforms, one of ordinary skill in the art will recognize that both negative and positive waveforms may also be used without departing from the scope of the present invention. In FIG. 5A, photomultiplier tube (PMT) signals 500, 505 and 510 are sampled using multiple thresholds to generate samples 540a-c, 550a-c and 560a-c, respectively. For the multiple threshold method, the samples consist of measurements of the times at which predetermined thresholds were crossed. Then the crystal of interaction 100 is located using a separate process described below. The location of the crystal of interaction 100 is used as an index to a look-up table, which includes correction times for each photomultiplier tube in the neighborhood (for example photomultipliers 135 and 140 of FIG. 1). Alternatively, the timing corrections may be determined from relative trigger timings among PMT waveforms 500, 505, and 510. In either case, in addition to correcting for timing variations that occur due to the specific crystal of interaction, the timing corrections can also correct for transit time variations in the PMTs and other electronic components, such as cables connecting the PMTs to the acquisition electronics.

Figure 5B:
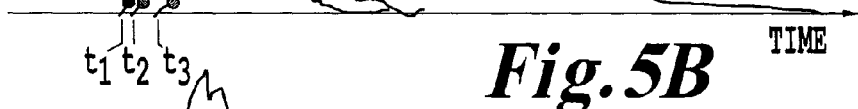
Figure 5C:
Figure 5D:
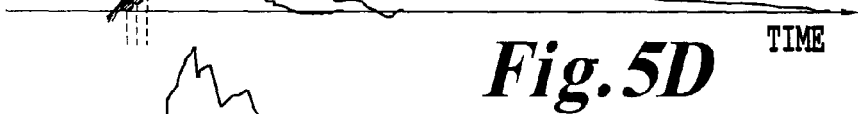
Figure 5E:
Figure 5F:

FIG. 5B includes the timing corrections t1, t2, and t3 for PMT waveforms 500, 505, and 510 respectively. In FIG. 5C, the samples of PMT waveforms 500, 505, and 510 are shifted in accordance with the timing corrections t1, t2, and t3. The shifted samples are then synchronized in time as shown in FIG. 5D, and the synchronized samples are summed in FIG. 5E and a final estimate for time of arrival $t_{final}$ is determined in FIG. 5F. The above-described process is equally applicable to PET systems employing full digital sampling except that the waveforms are periodically sampled at a high sample rate (1-5 GHz, for example) instead of being sampled at a finite number of threshold levels.

As one of ordinary skill in the art will recognize, the timing corrections can be applied through shifting of the samples by an integer multiple of the sampling rate for the case of full digital sampling. Alternatively, a sub-sample of sub-LSB adjustment can be made by re-sampling and interpolating before summing the signals. Other methods of applying the timing correction may also be used without departing from the scope of this embodiment of the present invention.

Figure 6:
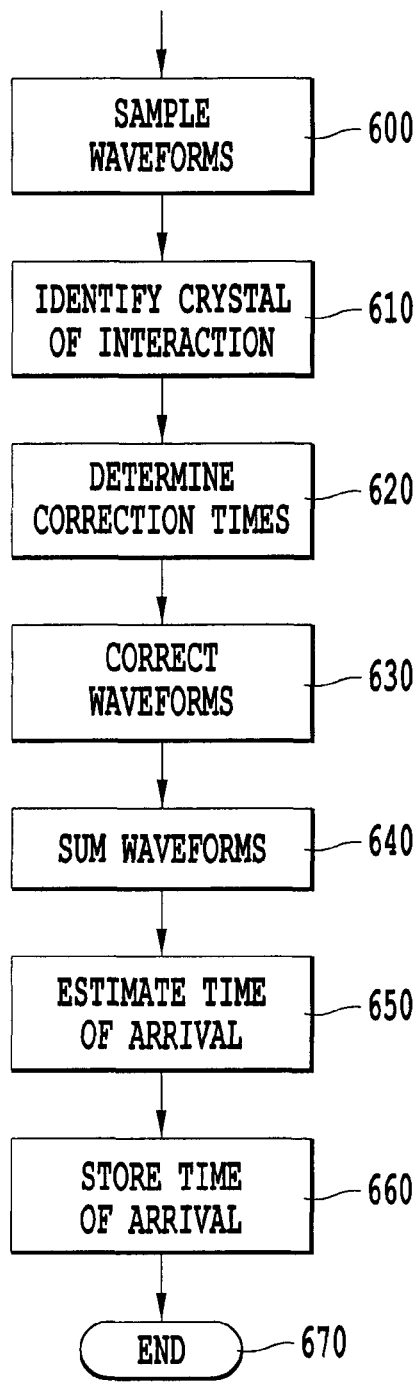
FIG. 6 is an algorithmic flow chart of gamma ray detection according to an exemplary embodiment of the present invention.

Next, the process for gamma ray detection is further described with respect to FIG. 6. In FIG. 6, waveforms from the photomultiplier tubes 135 and 140 are sampled at step 600. Then, at step 610, the location of the crystal of interaction 100 is identified. When using multi-threshold sample, preferably, the location of the crystal of interaction is identified through channels that are separate from those used by photomultiplier tubes 135 and 140 to acquire the sample information. For example, separate energy channels, which provide a signal that is proportional to the integrated number of scintillation photons incident on each photosensor, may be provided to determine the location of the crystal of interaction using centroid or statistical analysis.

Once the crystal of interaction 100 is located, the process moves to step 620 where correction times for each of the waveforms is determined using the crystal of interaction 100 location. For example, a lookup table in the electronic storage 375 may contain predetermined correction times for each photomultiplier tube 135 and 140 indexed by crystal locations in the crystal array. Thus, once the location of a crystal of interaction 100 is determined, this location is used to search the lookup table and identify correction times to be applied to the PMT waveforms.

At step 630, the identified correction times are used to correct the waveforms from the photomultiplier tubes 135 and 140. Specifically, each PMT waveform is time-shifted by a corresponding correction time. As discussed above, the time shift may be in the form of an integer multiple of a sampling rate used by the samplers 350, 355, 360, and 365, where the integer multiples of the sampling rate correspond to the correction times. Alternatively, the waveforms may be interpolated by a factor corresponding to the correction times. As one of ordinary skill in the art will recognize, the sampling rates for samplers 350, 355, 360, and 365 may be the same rate, or may be different rates for each of the samplers, and the correction times take into account any variation in sampling rate from one sampler to another.

In addition to a timing correction, step 630 can also include a baseline correction. The baseline correction removes any constant signal, such as offset resulting from amplification electronics in the acquisition system, which is present in the waveform prior to the leading edge of the scintillation pulse. Such offsets can vary slowly in time, for example, due to temperature variations. Removal of offsets and offset drift results in improved timing estimates.

Further, step 630 can also include a gain correction. The gain correction is applied as a multiplicative factor which corrects for variation in the gain of the PMT or the amplification electronics in the acquisition system. The gain correction results in improved timing estimates and also better estimates of other values, such as the energy of the gamma ray or the location of the gamma ray interaction, which can be derived from the sampled pulses.

At step 640, the waveforms are added together after being corrected with the correction times. In one exemplary embodiment, the samples of each of the waveforms are synchronized in time through interpolation. Once the samples are synchronized, the waveforms are summed at step 640 to generate a corrected waveform. The estimated arrival time of the gamma ray 115 at the crystal of interaction 100 is then generated from the corrected waveform at step 650. The estimate of the time of arrival of the gamma ray 115 is stored in, for example, electronic storage 375 at step 660, and the method ends at step 670.

Further, the photomultiplier tubes may be dynamically organized into neighborhoods or trigger zones based on the detection rate or location of the gamma ray interaction. The above-described process for gamma ray detection is then carried out using waveforms from photosensors within the neighborhood or trigger zone. This dynamic reorganization of the neighborhoods, or trigger zones, improves detection accuracy by reducing noise artifacts due to system noise levels, frequency of detection or detections rates, etc. In PET scanners, the dynamic reorganization of the trigger zones or neighborhoods accommodates different scan protocols with different detections rates, such as $^{82}$Rb cardiac scans and oncology FDG whole-body scans. In addition, reorganization of the neighborhoods is accomplished rapidly to account for very high detection rates.

The selection photosensor neighborhoods or trigger zones can be prospective or the selection can be retrospective. A prospective selection is made with information that is available before measurement and processing of photosensor signals from a particular event. Examples of prospective information used in a prospective selection include expected count rates, examination protocol and isotopes used in an examination protocol. As one of ordinary skill will recognize, other criteria can also be used in making a prospective selection without departing from the scope of the present invention.

A retrospective selection of a photosensor neighborhood or trigger zone is made after measurement and initial processing of photosensor signals corresponding to the particular event. Examples of information used in making a retrospective selection include waveform position, amplitude, noise, time since last event, and signal-to-noise ratio for each photosensor signal. As will be recognized by one of ordinary skill this list of retrospective information is merely exemplary and in no way limits the scope of the present invention.

Additionally, a combination of prospective and retrospective selection could be made. For example, for each protocol (e.g. whole body $^{18}$F-FDG and cardiac $^{82}$Rb) can have a different region sizes corresponding to different maximum trigger zone sizes used in the timing estimate. To be more specific, for a relatively low-count-rate exam like whole-body $^{18}$F-FDG, where the likelihood of pulse pile-up is lower, a trigger zone of up to seven photosensors may be used. For a high-count-rate exam like cardiac $^{82}$Rb, where the likelihood of pulse pile-up is higher, a trigger zone of up to four photosensors is used. Thus, the selection of a maximum of seven or four photosensors for the neighborhood or trigger zone is made prospectively, based on the exam protocol. Then, as the events are detected, each set of signals from the photosensors in the neighborhood is examined and the trigger zone is retrospectively adjusted, for example by eliminating photosensors with high noise levels, before making the final timing estimate.

In addition, algorithms which take into account multiple factors such as interaction position, signal amplitude at each photosensor, time since the last event detected by a photomultiplier tube, and noise levels can be used to determine dynamically which photomultiplier tube signals should be combined, thereby optimizing timing resolution.

Figure 7:
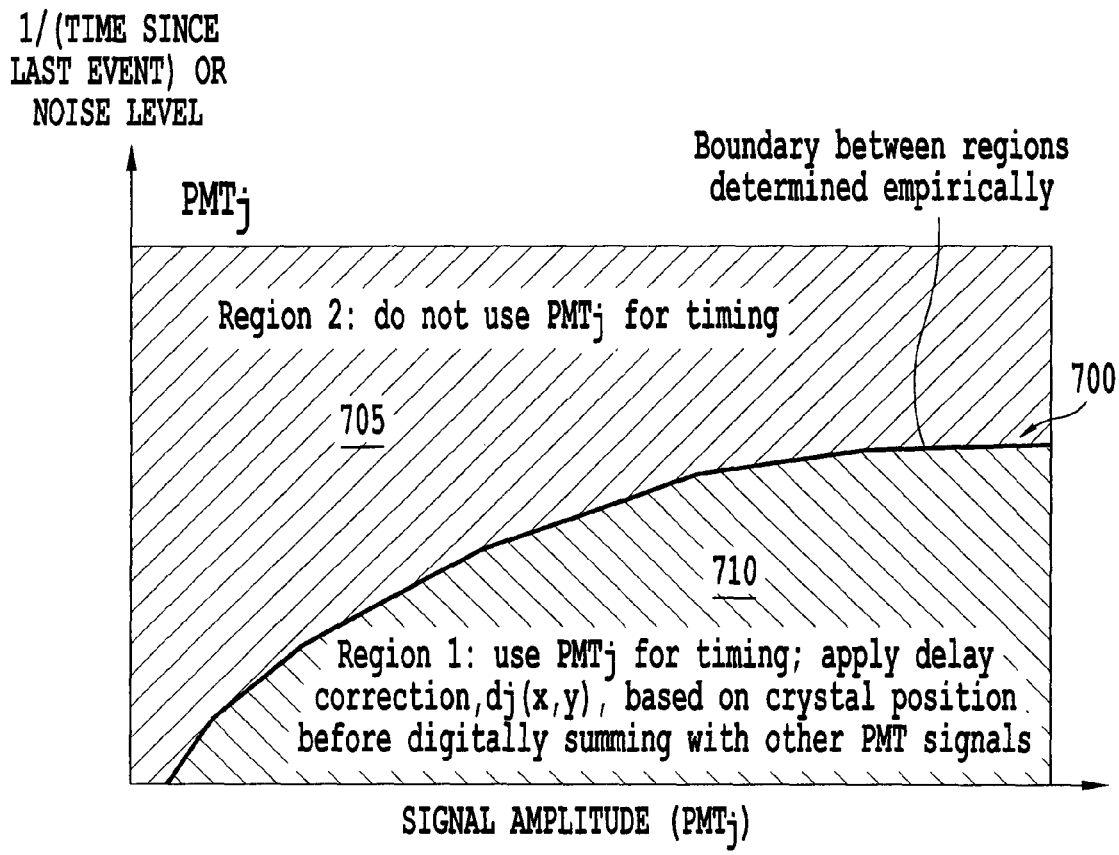
FIG. 7 is a graph of noise thresholding in accordance with an exemplary embodiment of the present invention.

For example, in FIG. 7, two regions are defined for each PMT. In the first region 710, PMT signal amplitude is high, and the time since the last event is long or the PMT noise is low. Thus, the corresponding PMT signal is used for the timing determination. An interaction-location dependent delay compensation is applied, as described above, before the PMT signal is summed with the other PMT signals which meet the above criteria for inclusion (i.e. fall within the first region 710).

Conversely, if the PMT signal amplitude is low, the time since the last event is too short or the noise in the preceding period is too high, the PMT signal will fall within the second region 705 and will be excluded from the timing estimate process described above.

Figure 8:
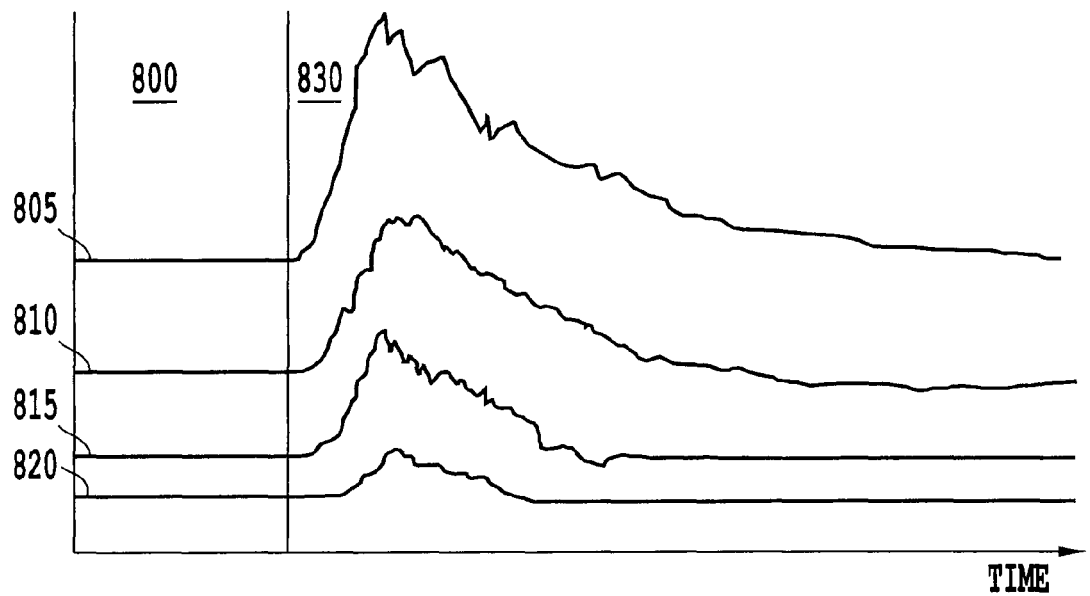
FIG. 8 is a graph of noise detection in waveforms according to an exemplary embodiment of the present invention.
Figure 9:
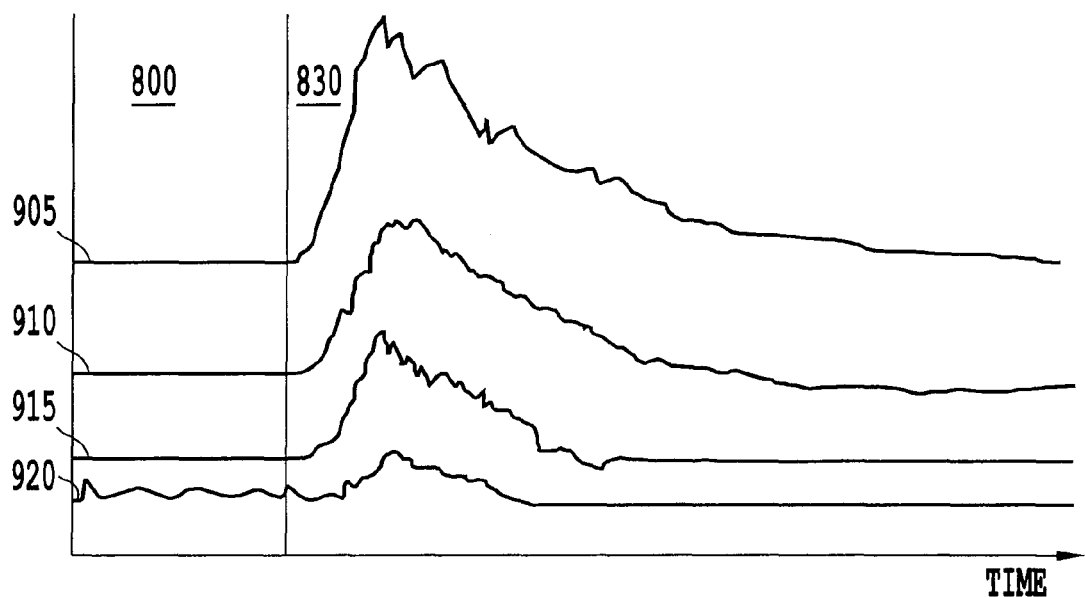
FIG. 9 is another graph of noise detection in waveforms according to an exemplary embodiment of the present invention.

In a fully digital approach, the noise in a PMT signal can be estimated by analyzing the PMT signal preceding the leading edge of the pulse. For example, in FIG. 8, four PMT signals 805, 810, 815, and 820 are shown prior to timing correction and combination as described above. The baseline portion 800 of PMT signals 805, 810, 815 and 820 is relatively noise-free in all cases. Therefore, all PMT signals 805, 810, 815 and 820 may be included in the timing estimation. Conversely, in FIG. 9, the leading edge portion 800 of PMT signal 920 includes noise and may therefore not improve the timing estimate. Therefore, PMT signal 920 is excluded from timing estimation, and only PMT signals 905, 910, and 915 are used.

Figure 10:
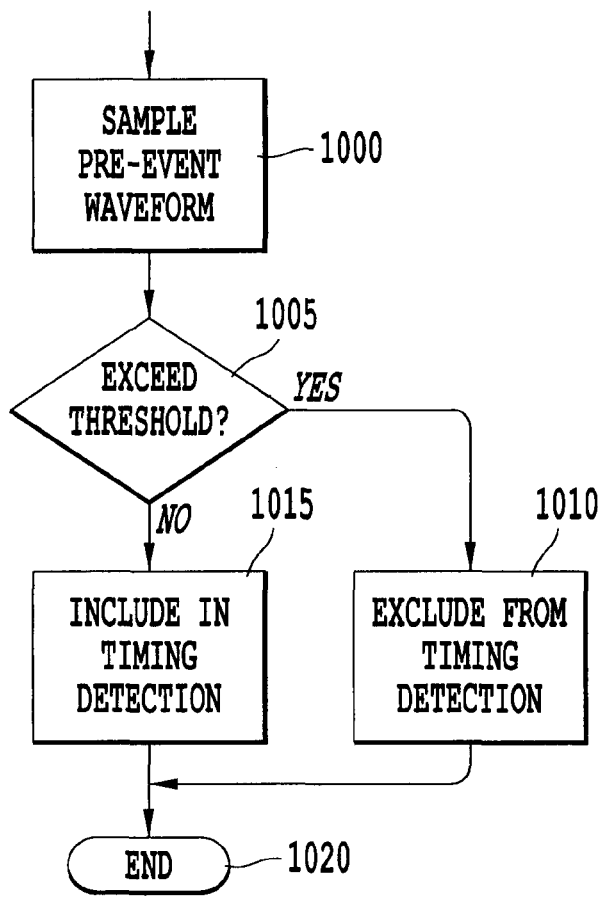
FIG. 10 is an algorithmic flow chart of photomultiplier tube waveform selection according to an exemplary embodiment of the present invention.

Next, a method of selecting photomultiplier tube waveforms for inclusion in timing estimation is described with reference to FIG. 10. In FIG. 10, the pre-event waveform, or baseline of the PMT waveform, is sampled as described above at step 1000. At step 1005, it is determined whether noise in the pre-event waveform exceeds a predetermined threshold. If the noise exceeds the predetermined threshold, the corresponding PMT waveform is excluded from timing detection at step 1010. Alternatively if the predetermined threshold is not exceeded at step 1005, the PMT waveform is marked for inclusion in timing detection at step 1015. The selection process ends at step 1020.

As one of ordinary skill in the art will recognize, multiple methods of noise thresholding are possible. For example, noise thresholding may be accomplished by comparing each individual sample in the baseline portion 800 of a waveform with an absolute threshold. Alternatively, the absolute value of the samples in the baseline portion 800 of the waveform may be averaged together, and the average value may then be compared to the noise threshold. In another embodiment, a ratio of the peak value in the baseline portion 800 and a peak value in the post-event section 830 is generated and compared to the noise threshold. A ratio of the average of the absolute value of the sample values in the baseline portion 800 to the average of the absolute value of the sample values in the post-event section 830 may also be compared to the noise threshold. As one of ordinary skill in the art will recognize, other methods of thresholding the waveforms generated by photomultiplier tubes 135 and 140 are also possible without departing from the scope of the present invention.

Alternatively, in a multi-threshold approach, noise in PMT signals may be estimated using a comparator set to a low threshold level (slightly above the noise, at a few millivolts, for example) and a counter to count the number of times the comparator is triggered within a predetermined time interval. If the count exceeds a predetermined threshold (which may vary based on the measured signal level), the corresponding PMT signal is excluded from timing estimation. As one of ordinary skill in the art will recognize, the above examples of PMT signal selection are merely exemplary, and other techniques of signal selection and noise filtering may be used in conjunction with the present invention without limitation.

As described above, the timing corrections may be stored as a look-up table, where each crystal has associated with it a number of PMTs and each PMT has a delay value for that particular crystal. The delay values included in the look-up table may be determined during a calibration period. As also described, the timing correction can correct for sources of timing variation, such as transit time variations in PMTs and electronics, that are not attributed solely to differences that arise due to optical path length differences.

In another exemplary embodiment, a variety of time pick-off methods, such as leading-edge discrimination or constant-fraction discrimination may be implemented digitally to estimate the final time of arrival from the digitally summed signal from the relevant PMTs. The relative signals from each PMT may also be determined from the samples, or from separate electronic channels, such as an energy channel that can be implemented digitally, or as a bank of analog shaping filters.

Also, the relative arrival times of the PMT signals at each of the photomultiplier tubes provide additional information relating to the location of the interaction (i.e., the crystal-of-interaction). This information is used, for example, in combination with the integrated PMT signals, to determine the location of the interaction. Combining all of this information using statistical methods (e.g., maximum likelihood) results in an improved position estimate.

Further, the relative timing information provides depth-of-interaction information because the relative change in optical path length for a high-angle and a low-angle photon depends on the depth-of-interaction. Thus, the relative timing information and associated depth-of-interaction information may be used to improve image quality by, for example, reducing or eliminating parallax error and improving spatial resolution, particularly at locations away from the scanner axis.

As the detailed shape of the scintillator pulse is determined in a fully digital PET system, the scintillator pulse may be analyzed to extract additional information, such as depth-of-interaction, and reduce or eliminate parallax error, thereby improving spatial resolution, particularly at locations away from the axis of the scanner.

Any processes, descriptions or blocks in flow charts should be understood as representing modules, segments, or portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

Numerous modifications and variations of the above-described embodiments of the present invention are possible in light of the above teachings. It is therefore to be understood that within the scope of the appended claims, the invention may be practiced otherwise than as specifically described herein.

The invention claimed is:

1. A method of improving timing resolution in a gamma ray detector, comprising:
   sampling, using a plurality of samplers, each configured to convert an analog signal into a digital signal, waveforms from a plurality of photosensors arranged over at least one crystal element, the waveforms being generated by the photosensors based on scintillation light emitted from a scintillation event within the at least one crystal element in response to arrival of a gamma ray;
   identifying a location of the scintillation event within the at least one crystal element;
   determining a correction time for each of the waveforms based on the identified location of the scintillation event;
   correcting each of the waveforms using the corresponding correction time; and
   estimating a time of arrival of the gamma ray at the at least one crystal element based the corrected waveforms.

2. The method according to claim 1, wherein the plurality of samplers acquire samples periodically at a rate of at least 1 GHz.

3. The method according to claim 1, wherein the correction times are stored in a look-up table and the location of the scintillation event is used as an index to the look-up table.

4. The method according to claim 1, wherein the correcting step comprises:
   interpolating each of the waveforms after correction to synchronize the waveforms in time.

5. The method according to claim 1, wherein the identifying step comprises:
   identifying the location of the scintillation event based on relative arrival times at each of the plurality of photosensors.

6. The method according to claim 1, wherein the correcting step comprises:
   interpolating the waveforms based on the correction times.

7. The method according to claim 1, wherein the correcting step comprises:
   correcting each waveform with a different correction time corresponding to the location of the scintillation event.

8. The method according to claim 1, further comprising:
   determining a depth of interaction within the at least one crystal element based on at least one of relative timing among the waveforms and a detailed shape of the waveforms; and
   reducing parallax error in a corresponding PET image using the determined depth of interaction.

9. The method according to claim 1, wherein the photosensors are photomultiplier tubes.

10. The method according to claim 1, wherein the photosensors are silicon photomultipliers.

11. The method according to claim 1, further comprising:
    dynamically selecting a subset of photosensors based on prospective information,
    wherein in the estimating step, the time of arrival of the gamma ray at the at least one crystal element is estimated based on corrected waveforms from the dynamically selected subset of the plurality of photosensors.

12. The method according to claim 11, wherein the prospective information includes a projected count rate, an exam protocol and an isotope used in the exam protocol.

13. The method according to claim 1, further comprising:
    dynamically selecting a subset of photosensors based on retrospective information,
    wherein in the estimating step, the time of arrival of the gamma ray at the at least one crystal element is estimated based on corrected waveforms from the dynamically selected subset of the plurality of photosensors.

14. The method according to claim 13, wherein the retrospective information includes waveform amplitudes corresponding to each of the plurality of photosensors, a time since the last gamma ray detection at each of the plurality of photosensors, and a measured noise level of each of the plurality of photosensors.

15. A gamma ray detector, comprising:
    a plurality of samplers configured to sample waveforms from a plurality of photosensors arranged over at least one crystal element, the waveforms being generated by the photosensors based on scintillation light emitted from a scintillation event in the at least one crystal element in response to arrival of a gamma ray;
    an electronic memory configured to store the waveforms after sampling; and
    a data processor connected to the plurality of samplers and configured
       to identify a location of the scintillation event within the at least one crystal element,
       to determine a correction time for each of the waveforms based on the identified location of the scintillation event,
       to correct each of the waveforms using the corresponding correction time, and
    to estimate a time of arrival of the gamma ray at the crystal of interaction based on the corrected waveforms.

16. The gamma ray detector according to claim 15, wherein the correction times are stored in a look-up table on the electronic memory, and the data processor determines each correction time using the location of the scintillation event as an index to the look-up table.

17. The gamma ray detector according to claim 15, wherein the data processor time-shifts each waveform by an integer multiple of a sampling rate used by a corresponding one of the plurality of samplers, the integer multiple corresponding to the corresponding correction time.

18. The gamma ray detector according to claim 15, wherein the data processor interpolates each waveform based on the corresponding correction time.

19. The gamma ray detector according to claim 15, wherein the data processor is further configured to determine a depth of interaction of the gamma ray in the at least one crystal element based on at least one of relative timings among the waveforms and detailed shape of the waveforms, and to reduce parallax error in a corresponding PET image using the depth of interaction.

20. The method according to claim 15, wherein the gamma ray detector is included in a positron emission tomography scanner.

21. The method according to claim 15, wherein the gamma ray detector is included in a time-of-flight positron emission tomography scanner.

22. A gamma ray detector, comprising:
  means for sampling a plurality of waveforms generated by a plurality of photosensors arranged over at least one crystal element, the waveforms being generated based on scintillation light emitted by a scintillation event in the at least one crystal element in response to arrival of a gamma ray;
  a memory storing the sampled waveforms;
  means for identifying a location of the scintillation event within the at least one crystal element;
  means for determining a correction timing for each of the waveforms based on the identified location of the scintillation event;
  means for correcting each of the waveforms using the corresponding correction timing; and
  means for estimating a time of arrival of the gamma ray at the at least one scintillation crystal element based on the corrected waveforms.

23. The gamma ray detector according to claim 22, further comprising:
  means for interpolating the waveforms after correction to synchronize the waveforms in time.

24. The gamma ray detector according to claim 22, further comprising:
  means for storing predetermined correction times in a look-up table indexed by crystal locations, the location of the scintillation event being used as a look-up table index to determine the correction timing.

25. The gamma ray detector according to claim 22, further comprising:
  means for time-shifting the waveforms by integer multiples of a predetermined sampling rate used to sample the waveforms, the integer multiple corresponding to the correction timing.

26. The gamma ray detector according to claim 22, further comprising:
  means for interpolating the waveforms in accordance with the correction timing.

27. The gamma ray detector according to claim 22, further comprising:
  means for determining a depth of interaction of the gamma ray in the at least one crystal element based on at least one of relative timings among the waveforms and detailed shape of the waveforms; and
  means for reducing parallax error in a corresponding PET image based on the depth of interaction.

28. A non-transitory computer-readable medium storing computer-readable instructions thereon, the computer-readable instructions, when executed by a computer, cause the computer to perform a method comprising:
  sampling waveforms from a plurality of photosensors arranged over at least one crystal element, the waveforms being generated by the photosensors based on scintillation light emitted from a scintillation event in the at least one crystal element in response to arrival of a gamma ray;
  identifying a location of the scintillation event within the at least one crystal element;
  determining a correction time for each of the waveforms based on the identified location of the scintillation event;
  correcting each of the waveforms using the corresponding correction time; and
  estimating a time of arrival of the gamma ray at the at least one crystal element based on the corrected waveforms.

* * * * *